No. 764,443. Patented July 5, 1904.

UNITED STATES PATENT OFFICE.

WALTHER FELD, OF HÖNNINGEN-ON-THE-RHINE, GERMANY.

PROCESS OF MAKING HYDROCYANIC ACID.

SPECIFICATION forming part of Letters Patent No. 764,443, dated July 5, 1904.

Application filed March 23, 1903. Serial No. 149,166. (No specimens.)

*To all whom it may concern:*

Be it known that I, WALTHER FELD, chemist and manufacturer, a subject of the German Emperor, residing at Hönningen-on-the-Rhine, in the German Empire, have invented certain new and useful Improvements in and Relating to the Production of Hydrocyanic Acid, of which the following is a specification.

In the specification of my British Patent No. 24,920, dated December 6, 1901, I have described the extraction or production of hydrocyanic acid from acid, neutral, or alkaline matters containing iron-cyanogen compounds by treating such matters with mercuric chlorid and decomposing the resulting mercuric cyanid by distillation with an acid, and especial reference is made therein to the treatment of matters containing iron-cyanid compounds and having an alkaline reaction by treating the said matters with mercuric chlorid in the presence of an excess of a salt of magnesium, aluminium, zinc, and manganese and other metals the hydrate, oxid, or carbonate of which do not precipitate mercuric oxid from from a solution of mercuric chlorid.

I have now found in treating matters containing iron-cyanid compounds and having an alkaline reaction with solutions of the salts mentioned under my aforesaid patent that I can use other mercuric compounds—such as oxid, sulfate, and the like—instead of chlorid previous to or after adding the salts, but that the mercuric-compound solutions (if soluble mercuric salts were used) after being repeatedly used become saturated with other salts, which have had to be got rid of by crystallization, which operation is inconvenient and involves loss of mercury. By my present invention I overcome the difficulties, as hereinafter described.

The alkaline or neutral matters containing soluble or insoluble ferric or ferrous cyanid compounds (the latter may be first oxidized) in their original condition or after having been treated with an excess of a hydrate, oxid, or carbonate of an alkali or of an alkaline earth or of magnesia are treated with mercuric oxid or other mercuric compound, adding or without adding the salts referred to in my aforesaid patent, the salts being used only in the succeeding stage of the process according to my present invention. The excess of the mercury oxid, or, if soluble mercury salts be used, the mercury oxid precipitated by the influence of the alkaline substances, will be contained in the precipitate of ferric hydroxid and other insoluble compounds, only the mercury combined with the cyanogen being in solution. After having separated this solution from the precipitate the said precipitate is treated (after being oxidized if a ferrous-cyanid compound was used) with a salt referred to in my aforesaid patent, whereby the whole of the mercury oxid will be dissolved. The solution thereof can be used again for the decomposition of iron-cyanid compounds, and so, also, can the mercuric compound resulting from the mercuric-cyanid solution after the hydrocyanic acid has been distilled therefrom with the aid of an acid. If such mercuric-compound solution contains too much of other salts, such as potassium or sodium salt or the like resulting from the decomposition of the iron-cyanid compound, the mercury can be precipitated from the solution in the form of oxid or the like and be washed, and then it can be utilized as before.

It may be desirable to prevent the precipitation of the mercuric oxid or the like from the mercury-compound solution which has become saturated with foreign salts. In this case the solution of the mercuric salt—say of mercuric chlorid or the like—in one of the salts mentioned under my aforesaid patent—say in a solution of a haloid of magnesium, of aluminium, of zinc, or of manganese or the like—is used for decomposing the iron-cyanid compounds in the way referred to in my said patent; but the iron cyanids of the alkaline earths are used in the decomposition instead of the alkali salts of the iron cyanids. The salts of the alkaline earths can be obtained by treating insoluble iron cyanids—such as Prussian blue, ammonium ferrocyanid, or the like—with alkaline-earth compounds. The compounds of alkaline earth and ferrocyanid, in whatever way obtained, after the ferrous cyanids have been oxidized into ferricyanid are treated, either in their original condition or after adding a hydrate, oxid, or carbonate of an alkaline earth or of magnesia, (an excess thereof not being objectionable,) with one of the aforesaid salts and with a mercuric solution or with a solution containing a mercuric compound together with one of those salts or by adding a mercuric compound before adding one of the said salts. The mercury combining with the cyanogen of the ferricyanid, no insoluble mercury compound will be precipitated, but only ferric hydroxid and the excess of the alkaline earth or magnesium hydrate or carbonate with other insoluble impurities will be in the precipitate. After the precipitate has been separated from the mercuric solution by filtration hydrocyanic acid is disengaged from the solution by distilling with an acid which will form an insoluble salt with the alkaline earth present, such as sulfuric or phosphoric acid, the said acid combining with the alkaline earth in solution, the alkaline-earth sulfate or phosphate being precipitated and being filtered off, together with the ferric-hydroxid precipitate, at the next operation in which the mercuric solution is re-used. The successive reactions are expressed by the following equations:

(1) $Fe_7Cy_{18}+6Ca(OH)_2=3Ca_2FeCy_6+2Fe_2(OH)_6.$ 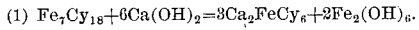

(2) $2Ca_2FeCy_6+CaOCl_2+H_2SO_4=$ 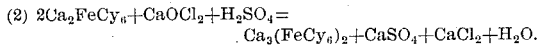
$Ca_3(FeCy_6)_2+CaSO_4+CaCl_2+H_2O.$ (3) $Ca_3(FeCy_6)_2+3Ca(OH)_2+6HgCl_2+18MgCl_2=$ 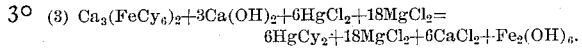
$6HgCy_2+18MgCl_2+6CaCl_2+Fe_2(OH)_6.$ (4) $6HgCy_2+18MgCl_2+6CaCl_2+6H_2SO_4=$ 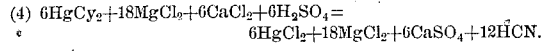
$6HgCl_2+18MgCl_2+6CaSO_4+12HCN.$ Although ferrocyandid compounds can be treated in the same way, it is preferable to first convert them by oxidation into ferricyanids.

Although insoluble iron-cyanogen compounds can be treated in the same way, it is preferable to first render them soluble by treatment with a hydroxid or sulfid of an alkali, of an alkaline earth, of ammonium or magnesium, or with mixtures yielding the same.

The following gives a practical example of the process when potassium ferricyanid is decomposed by mercuric oxid:

Example I: Sixty-five parts of potassium ferricyanid are dissolved, say, in six hundred parts of water. To decompose this amount of ferricyanid, about one hundred and thirty parts of mercuric oxid are theoretically necessary. An excess of the mercuric compound being unimportant and in order to show how the process works with an excess of mercuric oxid, I add one hundred and fifty parts of this to the said solution and keep it boiling for about twenty minutes. The proportion of mercuric oxid used is thus: seven molecules to two molecules of the ferricyanid. The following reaction occurs:

(5) $2K_3FeCy_6+7HgO+6H_2O=6HgCy_2+6KOH$
$+(Fe_2(OH)_6+HgO).$ 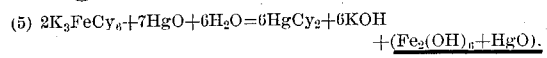

A precipitate of ferric hydrate is formed which contains the excess of mercuric oxid. The solution is separated from the precipitate and distilled with about seventy parts of hydrochloric acid, the strength of the acid used being unimportant and an excess being of no consequence. After about fifteen to thirty minutes boiling all hydrocyanic acid will be liberated.

(6) $6HgCy_2+6KOH+18HCl=6HgCl_2+6KCl+12HCN+6H_2O.$ 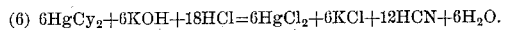

The solution contains mercuric chlorid and potassium chlorid. It may be used again for further decompositions of alkaline ferricyanid:

(7) $2K_3FeCy_6+6HgCl_2+6KCl+6KOH=$
$6HgCy_2+18KCl+Fe_2(OH)_6.$ 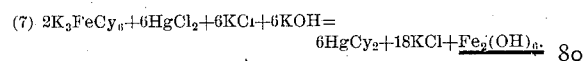

The more the mercuric solution is used the more alkali chlorid it contains. From time to time, therefore, the mercuric compound must be separated from the alkali chlorid, which I may do by precipitating the mercury by an alkaline compound:

(8) $6HgCl_2+18KCl+6Ca(OH)_2=6HgO+18KCl+6CaCl_2+6H_2O.$ 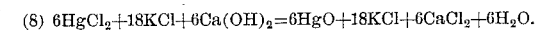

The precipitate of the first treatment, (reaction No. 5,) containing ferric hydroxid with about twenty parts of mercuric oxid, is treated with a salt of magnesia, alumina, zinc, or manganese or others which are decomposed by mercuric oxid. I take an excess of magnesium chlorid—say forty parts—which I dissolve in about two hundred parts of water and heat the precipitate with this solution. All the mercuric oxid will be dissolved, and the hotter the solution the quicker the reaction will be:

(9) $HgO+4MgCl_2+H_2O=Mg(OH)_2+HgCl_2+3MgCl_2.$ 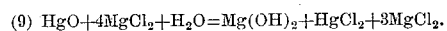

The mercuric oxid precipitated in accordance with reaction No. 8 may be used again to decompose iron cyanids, or I may dissolve it by treatment with magnesium chlorid in the same way as shown in reaction No. 9. In this case I mix the two mercuric-magnesium-chlorid solutions and use them to decompose an alkaline-earth ferricyanid. The following Example II shows that the mercuric compound is kept nearly free from other salts if I work in this way:

Example II: Fifty-five parts of calcium ferricyanid are dissolved in about six hundred parts of water. The solution may be more or less concentrated, the result being the same. If the solution is of alkaline reaction, I add so much of one of the salts mentioned as is necessary to neutralize the solution in order to avoid the precipitation of mercuric oxid if the mercuric-chlorid solution is added. To this solution I add the mercuric-chlorid-magnesium-chlorid solution resulting from Example I. This contains one hundred and fifty parts of mercuric oxid in form of mercuric chlorid. The proportions, therefore, are the same as in Example I. Both solutions—that of ferricyanid and that of mercuric chlorid and magnesium chlorid—are heated, preferably, to the boiling-point before being mixed. If the ferricyanid solution has no alkaline reaction, I may add an oxid, hydroxid, or carbonate of an alkali, alkaline earth, or of magnesium before or after the solutions are mixed. I take so much of calcium carbonate (chalk) as is necessary to precipitate the whole of the iron. Thirty parts of it are sufficient. Using more chalk will not alter the result. After having mixed the solutions and added the chalk five or ten minutes boiling will complete the decomposition. The solution is separated from the precipitate, which contains only ferric hydroxid and the excess of chalk used. The solution is distilled with about sixty parts of sulfuric acid in order to render the calcium insoluble. After the solution is free from hydrocyanic acid it is preferably neutralized by an oxid of an alkaline earth and may be used again without being separated from the insoluble calcium sulfate, this being filtered off, together with the ferric hydroxid, after the next operation. The successive reactions are expressed by the following equations:

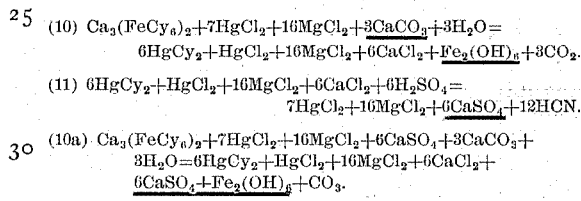

The underlined compounds are the insoluble ones.

I claim as my invention—

1. The process of making hydrocyanic acid by aid of mercuric compounds from matters containing iron cyanids, which consists in treating them with alkaline substances which will precipitate ferric hydroxid from ferric salts, and with mercuric compounds together with a salt of a metal the hydrate, oxid and carbonate of which do not precipitate mercuric compounds from mercuric solutions, separating the mercuric-cyanid solution thus formed, from the precipitate and decomposing the mercuric cyanid by distillation with acid.

2. The process of making hydrocyanic acid by aid of mercuric compounds from matters containing iron cyanids, which process consists in treating insoluble matters with alkaline substances to dissolve the iron cyanid, and treating them with mercuric compounds together with a salt of a metal the hydrate oxid and carbonate of which do not precipitate mercuric compounds from mercuric solutions, separating the mercuric-cyanid solution thus formed from the precipitate and decomposing the mercuric cyanid by distillation with acid.

3. The process of making hydrocyanic acid by aid of mercuric compounds from matters containing iron cyanids, which process consists in the preliminary conversion of the iron cyanids into alkaline-earth-iron-cyanid compounds, treating with mercuric compounds together with a salt of a metal, the hydrate oxid and carbonate of which do not precipitate mercuric compounds from mercuric solutions, separating the mercuric-cyanid solution thus formed from the precipitate and decomposing the mercuric cyanid by distillation with an acid, which forms an insoluble salt with the alkaline earth of the alkaline-earth-iron-cyanid compound.

4. The process of making hydrocyanic acid by aid of mercuric compounds from matters containing iron cyanids, which process consists in the preliminary conversion of ferrous-cyanid compounds into ferric-cyanid compounds by oxidizing means treating with mercuric compounds together with a salt of a metal the hydrate oxid and carbonate of which do not precipitate mercuric compounds from mercuric solutions, and with an alkaline substance which will precipitate ferric hydroxid from ferric salts, separating the mercuric-cyanid solution thus formed from the precipitate and decomposing the mercuric cyanid by distillation with acid.

In testimony whereof I affix my signature in presence of two witnesses.

WALTHER FELD.

Witnesses:
W. FRHRR VON LYNDKER,
CARL SCHMITT.